(12) United States Patent
Osamu et al.

(10) Patent No.: US 12,497,493 B2
(45) Date of Patent: Dec. 16, 2025

(54) RESIN FILM, LAMINATE, AND PACKAGING BODY

(71) Applicant: TOPPAN INC., Tokyo (JP)

(72) Inventors: Tokinoya Osamu, Tokyo (JP); Furuta Kaoru, Tokyo (JP); Kinoshita Kayo, Tokyo (JP)

(73) Assignee: TOPPAN INC., Tokyo (JP)

( * ) Notice: Subject to any disclaimer, the term of this patent is extended or adjusted under 35 U.S.C. 154(b) by 387 days.

(21) Appl. No.: 18/149,343

(22) Filed: Jan. 3, 2023

(65) Prior Publication Data

US 2023/0139647 A1     May 4, 2023

Related U.S. Application Data

(63) Continuation of application No. PCT/JP2021/026011, filed on Jul. 9, 2021.

(30) Foreign Application Priority Data

| Jul. 9, 2020 | (JP) | 2020-118818 |
| Jul. 9, 2020 | (JP) | 2020-118819 |
| Jul. 9, 2020 | (JP) | 2020-118820 |
| Jul. 16, 2020 | (JP) | 2020-122415 |

(51) Int. Cl.
   *C08J 7/048*     (2020.01)
   *B65D 65/42*     (2006.01)
   *C08J 5/18*     (2006.01)

(52) U.S. Cl.
   CPC .............. *C08J 7/048* (2020.01); *B65D 65/42* (2013.01); *C08J 5/18* (2013.01); *C08J 2367/02* (2013.01)

(58) Field of Classification Search
None
See application file for complete search history.

(56) References Cited

U.S. PATENT DOCUMENTS

2019/0126599 A1    5/2019    Sargeant et al.

FOREIGN PATENT DOCUMENTS

| EP | 3 778 726 A1 | 2/2021 |
| JP | H09-174780 A | 7/1997 |
| JP | 2008-049605 A | 3/2008 |
| JP | 2013-123895 A | 6/2013 |
| JP | 2014-065282 A | 4/2014 |
| JP | 2018-144893 A | 9/2018 |
| JP | 6439998 B2 | 12/2018 |
| JP | 2019-018410 A | 2/2019 |
| JP | 2019-081607 A | 5/2019 |
| JP | 2020-032596 A | 3/2020 |
| JP | 2020-049942 A | 4/2020 |
| JP | 2020-066230 A | 4/2020 |

(Continued)

OTHER PUBLICATIONS

European Extended Search Report issued in corresponding European Patent Application No. 21837239.9 dated Nov. 30, 2023 (11 pages).

(Continued)

*Primary Examiner* — James C Yager (74) *Attorney, Agent, or Firm* — Foley & Lardner LLP (57) ABSTRACT

A resin film configured to form, together with a gas barrier layer, a laminate for producing a packaging body. The resin film contains polyethylene terephthalate. In a loss tangent curve indicating the relationship between tan δ and temperature of the resin film, the tan δ at a peak position is 0.160 or more and 0.190 or less.

8 Claims, 4 Drawing Sheets

(56) References Cited

FOREIGN PATENT DOCUMENTS

| | | |
|---|---|---|
| JP | 2020-070429 A | 5/2020 |
| WO | WO-2015/146496 A1 | 10/2015 |
| WO | WO-2019/189221 A1 | 10/2019 |

OTHER PUBLICATIONS

International Searching Authority, "International Search Report," issued in connection with International Patent Application No. PCT/JP2021/026011, dated Sep. 21, 2021.
International Searching Authority, "Written Opinion," issued in connection with International Patent Application No. PCT/JP2021/026011, dated Sep. 21, 2021.
Opposition issued in corresponding Japanese Patent No. 7592994 dated Jul. 24, 2035.

RESIN FILM, LAMINATE, AND PACKAGING BODY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/026011, filed on Jul. 9, 2021, which in turn claims the benefit of JP 2020-118818, filed Jul. 9, 2020; JP 2020-118819, filed Jul. 9, 2020; JP 2020-118820, filed Jul. 9, 2020; JP 2020-122415, filed Jul. 16, 2020; the disclosures of all which are incorporated herein by reference in its entirety.

TECHNICAL FIELD

The present invention relates to a resin film, a laminate including the resin film, and a packaging body.

BACKGROUND

Resin films containing polyethylene terephthalate are widely used as packaging materials for forming packaging bodies for packaging objects, such as food, medicine, and cosmetic. In order to suppress deterioration in the quality of the objects, packaging materials preferably have gas barrier properties, which make it difficult for gases, such as oxygen and water vapor, to pass through. For this reason, laminates of a transparent film and a barrier layer containing a metal film or a metal oxide film are used as packaging materials (see, for example, PTL 1).

CITATION LIST

Patent Literature

PTL 1, JP 2019-081607 A.

SUMMARY OF INVENTION

Technical Problem

Conventionally, the gas barrier performance of packaging bodies is evaluated assuming the time of production, storage, and use. However, in the process of distribution of products, which are packed objects, external forces that cause deformation, such as folding and twisting, in the packaging materials may be repeatedly applied to the products, as in the case in which vibration is applied to the products during transportation. There has been a demand for packaging materials that can suppress reduction in the gas barrier performance due to application of such external forces.

An object of the present invention is to provide a resin film that can suppress reduction in gas barrier performance of a laminate due to external forces applied to the laminate, particularly external forces applied to the laminate during transportation, and to also provide a laminate and a packaging body.

Solution to Problem

In an embodiment, a resin film is provided. The resin film is configured to form, together with a gas barrier layer, a laminate for producing a packaging body. The resin film contains polyethylene terephthalate. The resin film is configured to have tan δ of 0.160 or more and 0.190 or less at a peak position of a loss tangent curve indicating the relationship between tan δ and temperature of the resin film.

In another embodiment, a resin film is provided. The resin film is configured to form, together with a gas barrier layer, a laminate for producing a packaging body. The resin film contains polyethylene terephthalate. The resin film is configured to have a temperature of 95° C. or higher and 102° C. or lower at a peak position of a loss modulus curve indicating the relationship between loss modulus and temperature of the resin film, and to have a loss modulus of 0.30 GPa or more and 0.37 GPa or less at the peak position.

In another embodiment, a resin film is provided. The resin film is configured to form, together with a gas barrier layer, a laminate for producing a packaging body. The resin film contains polyethylene terephthalate. The resin film is configured to have a transition temperature of 80° C. or higher and 88° C. or lower in a storage modulus curve indicating the relationship between storage modulus and temperature of the resin film, the transition temperature being a temperature at which transition of the resin film from a glass state to a rubber state occurs, and to have a storage modulus of 3.8 GPa or more and 4.1 GPa or less at the transition temperature.

In another embodiment, a resin film is provided. The resin film is configured to form, together with a gas barrier layer, a laminate for producing a packaging body. The resin film contains polyethylene terephthalate. The resin film has a flow direction during production thereof and is configured to have a yield stress of 109 MPa or more and 117 MPa or less according to JIS K 7161-1:2014 in the flow direction.

In another embodiment, a laminate is provided. The laminate includes the above resin film and a gas barrier layer.

In another embodiment, a packaging body is provided. The packaging body includes the above resin film and a gas barrier layer.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

An embodiment of a resin film, a laminate, and a packaging body will be described with reference to FIGS. 1 to 8. In the following, the resin film, the laminate, the packaging body, the physical properties of the resin film, and the Examples will be described in this order.

[Resin Film]

A resin film 10 will be described with reference to FIG. 1.

Figure 1:
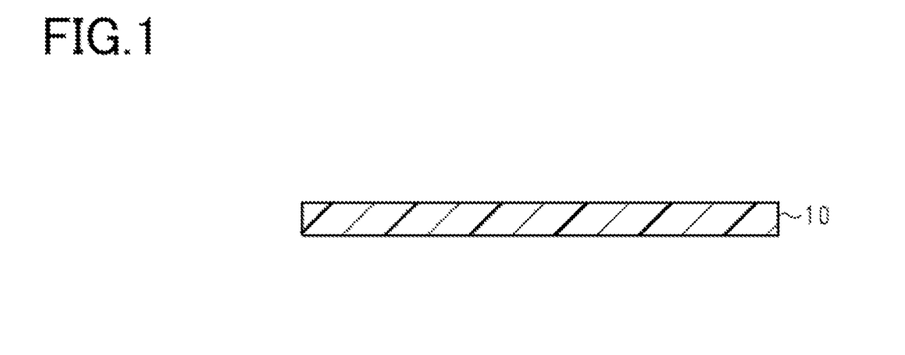
FIG. 1 is a cross-sectional view illustrating a structure of a resin film according to an embodiment.

The material of the resin film 10 shown in FIG. 1 contains polyethylene terephthalate (PET). PET is at least one of virgin PET, which is newly synthesized from raw materials, such as petroleum, and recycled PET, which is PET that has been recycled. PET products to be recycled include used plastic bottles. The recycled PET constituting the resin film 10 is at least one of PET recycled by mechanical recycling and PET recycled by chemical recycling.

In mechanical recycling, a PET product is pulverized, and the pulverized PET product is then washed to remove dirt and foreign matter from the surface. Thereafter, the resin, that is, the pulverized PET product, is exposed to high temperatures to remove contaminants remaining inside the resin, thereby obtaining recycled PET. In chemical recycling, a PET product is pulverized, and the pulverized PET product is then washed to remove dirt and foreign matter from the surface. Thereafter, the resin is returned to an intermediate raw material by depolymerization, and the intermediate raw material is purified, followed by repolymerization, thereby obtaining recycled PET. Since mechanical recycling does not require large-scale facilities for chemical reactions, the cost and environmental load required for producing recycled PET are lower than those of chemical recycling. To reduce the cost and environmental load, the recycled PET contained in the resin film 10 is preferably PET recycled by mechanical recycling.

The resin film 10 may contain, in addition to recycled PET, virgin PET, which is newly synthesized from raw materials, such as petroleum. To reduce the cost and environmental load, the ratio of recycled PET relative to the total mass of the resin film 10 is preferably 60% or more and 100% or less.

The repeating units constituting PET include a diol unit and a dicarboxylic acid unit. In virgin PET, an example of the diol unit is ethylene glycol, and an example of the dicarboxylic acid unit is terephthalic acid. In recycled PET, an example of the diol unit is ethylene glycol, and an example of the dicarboxylic acid unit contains terephthalic acid and isophthalic acid. The ratio of isophthalic acid in the total dicarboxylic acid units is preferably 0.5 mol % or more and 5 mol % or less. The repeating units constituting PET may contain diethylene glycol in the above diol unit.

In PET constituting plastic bottles used in recycling, the diol unit is ethylene glycol, and the dicarboxylic acid unit contains terephthalic acid and isophthalic acid. This makes it possible to suppress the crystallization of PET, consequently improving the processability of materials for plastic bottles. Accordingly, the dicarboxylic acid unit of the recycled PET constituting the resin film 10 contains dicarboxylic acid units of such plastic bottles, that is, terephthalic acid and isophthalic acid.

The average molecular weight of PET contained in the resin film 10 is preferably 1000 or more and one million or less. The resin film 10 may contain resins other than PET, and various additives. Examples of additives include plasticizers.

The resin film 10 is formed from a single layer or a plurality of layers. When the resin film 10 is formed from a plurality of layers, the materials constituting the layers are the same or different from each other. In other words, the plurality of layers may be layers formed from a first material. Alternatively, the plurality of layers may comprise a layer formed from a first material, and a layer formed from a second material, which is different from the first material.

When the materials constituting the layers are different from each other, the resin film 10 may be a laminate of a layer formed from recycled PET, and a layer formed from virgin PET. Alternatively, when the materials constituting the layers are different from each other, the resin film 10 may be a laminate of a layer containing recycled PET at a first ratio relative to virgin PET, and a layer containing recycled PET at a second ratio, which is different from the first ratio, relative to virgin PET.

The thickness of the resin film 10 is selected depending on various characteristics required for packaging bodies, such as various types of environmental resistance, which is resistance to heat, moisture, etc., preservability of contents, filling properties of contents, sealing processability, and printing suitability including for marking. In terms of increasing the processability of the resin film 10, for example, the thickness of the resin film 10 is preferably selected from the range of 3 µm or more and 100 µm or less, and more preferably 6 µm or more and 50 µm or less.

The method for forming the resin film 10 is a melt-extrusion molding method or a melt-coextrusion molding method. The flow direction of the resin film 10 is a direction in which the formation of PET advances in the production of the resin film 10. The flow direction is also referred to as MD (machine direction) or vertical direction. The direction orthogonal to the flow direction is also referred to as TD (transverse direction) or lateral direction. When the resin film 10 is formed from a plurality of layers, the flow direction of each layer is the same.

The resin film 10 is an unstretched film, an uniaxially stretched film stretched in the MD or TD direction by a predetermined ratio, or a biaxially stretched film stretched in the MD and TD directions sequentially or simultaneously by a predetermined ratio. When the resin film 10 is formed from a plurality of layers, the layers in the resin film 10 are stretched in the same direction.

[Laminate]

Figure 2:
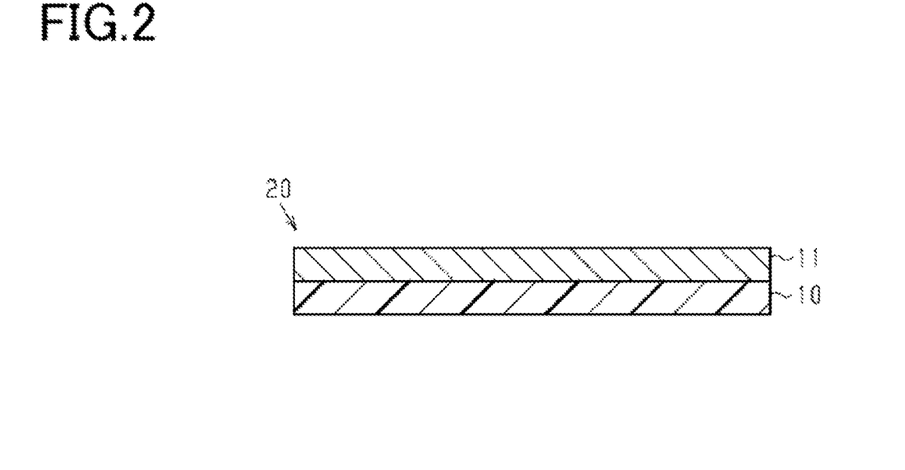
FIG. 2 is a cross-sectional view illustrating a structure of a laminate according to the same embodiment.

A laminate 20 will be described with reference to FIG. 2. The laminate 20 includes the resin film 10 and a gas barrier layer 11. The gas barrier layer 11 has the function of increasing the gas barrier performance of the laminate 20.

The gas barrier layer 11 contains, for example, a vapor deposition film. The vapor deposition film is an inorganic oxide film or a metal film. Examples of inorganic oxides include oxides of silicon, aluminum, magnesium, calcium, potassium, tin, sodium, boron, titanium, lead, zirconium, yttrium, and the like. Examples of metals include aluminum, magnesium, tin, sodium, titanium, lead, zirconium, yttrium, gold, chromium, and the like.

The method for forming the vapor deposition film may be, for example, vacuum vapor deposition, sputtering, ion plating, plasma-enhanced chemical vapor deposition (CVD), or the like. In terms of enhancing the productivity of the laminate, the method for forming the vapor deposition film is preferably vacuum vapor deposition. In vacuum vapor deposition, electron beam heating, resistance heating, or induction heating is preferably used to heat the vapor deposition material. In terms of increasing the degree of freedom in the selection of the vapor deposition material, it is preferable to use electron beam heating. In terms of increasing the adhesion between the vapor deposition film and the resin film 10, and increasing the density of the vapor deposition film, a plasma-assisted method or an ion beam-assisted method can be used in vacuum vapor deposition. In terms of increasing the transparency of the vapor deposition layer, the gas barrier layer 11 may be formed by reactive vapor deposition. In reactive vapor deposition, for example, a reactive gas, such as oxygen gas, is supplied to the film-forming space.

The laminate 20 for forming a transparent packaging bag includes a vapor deposition film formed from an inorganic oxide. In particular, a vapor deposition film formed from aluminum oxide or silicon oxide is preferred. The laminate 20 for forming a light-shielding packaging bag includes a vapor deposition film made of metal. In particular, a vapor deposition film made of aluminum is preferred. The packaging bag is an example of the packaging body.

The gas barrier layer 11 may be formed from a plurality of barrier layers. In this case, each barrier layer may be formed from the same material, or the plurality of barrier layers may include a barrier layer formed from a first material, and a barrier layer formed from a second material, which is different from the first material.

The thickness of the gas barrier layer 11 is selected from the range of, for example, 5 nm or more and 300 nm or less. Selecting the thickness of the gas barrier layer 11 to be 5 nm or more makes it possible to increase the uniformity of the gas barrier layer 11, and to allow the gas barrier layer 11 to have sufficient thickness. Therefore, the gas barrier layer 11 can sufficiently exhibit gas barrier function. On the other hand, with the thickness selected to be 300 nm or less, the gas barrier layer 11 can maintain flexibility. This can prevent the formation of cracks in the gas barrier layer 11 caused by external factors after film formation, such as bending and stretching. The thickness of the gas barrier layer 11 is suitably selected depending on the type of inorganic compound that forms the gas barrier layer 11, and the structure of the laminate 20. In terms of increasing the uniformity of the thickness of the gas barrier layer 11, the thickness of the gas barrier layer 11 more preferably falls within the range of 10 nm or more and 150 nm or less.

The gas barrier layer 11 may contain a coating film having gas barrier performance in addition to, or in place of, the vapor deposition film described above. The coating film is made of a material containing a resin. The following describes an example in which the gas barrier layer 11 includes a coating film formed on a vapor deposition film of an inorganic oxide. The coating film protects the vapor deposition film to thereby increase the gas barrier performance of the gas barrier layer.

The coating film is formed from, for example, a water-soluble polymer and an inorganic compound. The water-soluble polymer may be, for example, polyvinyl alcohol, polyvinyl pyrrolidone, starch, methyl cellulose, carboxymethyl cellulose, sodium alginate, or the like. In terms of increasing the gas barrier performance of the gas barrier layer 11, the water-soluble polymer is preferably polyvinyl alcohol (PVA).

The inorganic compound contained in the coating film may be, for example, a silicon compound represented by $Si(OR^1)_4$ or $R^2Si(OR^3)_3$, or a hydrolysate of the silicon compound. In the chemical formulas that represent the silicon compounds, $OR^1$ and $OR^3$ are hydrolyzable groups, and $R^2$ is an organic functional group. The inorganic compound may contain one or more silicon compounds, or hydrolysates of such silicon compounds.

$Si(OR^1)_4$ may be, for example, tetraethoxysilane ($Si(OC_2H_5)_4$) (TEOS). TEOS is preferred because it is relatively stable in aqueous solvents after hydrolysis. Further, $R^2$ in $R^2Si(OR^3)_3$ is preferably selected from the group consisting of a vinyl group, an epoxy group, a methacryloxy group, a ureido group, and an isocyanate group.

The coating film is formed by applying a mixed solution of a solvent, a water-soluble polymer, and a silicon compound or a hydrolysate of the silicon compound to the vapor deposition layer, and then heating and drying the applied mixed solution. The solvent may be water or a mixed solvent of water and alcohol. When a mixed solution is formed, a water-soluble polymer is first dissolved in a solvent, and then a silicon compound or a hydrolysate of the silicon compound is mixed in. The mixed solution may contain additives as long as the gas barrier performance of the coating film formed using the mixed solution is not impaired. Examples of additives include isocyanate compounds, silane coupling agents, dispersants, stabilizers, viscosity modifiers, colorants, and the like.

When the water-soluble polymer is PVA, the mass ratio of PVA relative to the total solid content of the mixed solution is preferably 20 mass % or more and 50 mass % or less, and more preferably 25 mass % or more and 40 mass % or less. With 20 mass % or more of PVA contained, the flexibility of the coating film is maintained. Therefore, the coating film can be easily formed. Further, with 50 mass % or less of PVA contained, the gas barrier layer 11 can have sufficient barrier performance.

The thickness of the coating film is selected from the range of, for example, 0.05 μm or more and 30 μm or less.

When the gas barrier layer 11 comprises a vapor deposition film and a coating film, in the laminate 20, the vapor deposition film is located on the resin film 10, and the coating film is located on the vapor deposition film. Because of this, the coating film is in contact with the vapor deposition film.

In terms of enhancing the adhesion between the resin film 10 and the gas barrier layer 11, the surface of the resin film 10, on which the gas barrier layer 11 is to be formed, may be subjected to surface treatment, such as plasma treatment and corona treatment. When the gas barrier layer 11 is formed from an inorganic oxide, an anchor coat layer may be located between the resin film 10 and the gas barrier layer 11. Due to the surface treatment and the anchor coat layer, the adhesion between the resin film 10 and the vapor deposition layer after heat sterilization, the barrier performance of the laminate 20, and the like can be enhanced.

The gas barrier layer 11 may contain metal foil, a layer formed from metal nitride, and the like, in addition to the vapor deposition film and coating film described above, or in place of at least one of the vapor deposition film and coating film described above. When the gas barrier layer 11 comprises one or more layers other than the vapor deposition film and the coating film, the one or more other layers may be positioned between the vapor deposition film and the coating film. Alternatively, one or more layers other than the coating film may be positioned between the vapor deposition film and the resin film.

The laminate 20 may comprise a seal layer, an adhesion layer, a decorative layer, an information display layer, and the like, in addition to the resin film 10 and the gas barrier layer 11. The seal layer contains a thermoplastic resin. The seal layer is melted by heat sealing when a packaging body is formed using the laminate 20. Because of this, in two laminates 20, the edges of a first laminate 20 are fused with the edges of a second laminate 20. Alternatively, in one laminate 20, first and second portions of the laminate 20 are fused together. The adhesion layer increases the adhesion between the gas barrier layer 11 and the upper layer of the gas barrier layer 11, or the adhesion between the gas barrier layer 11 and the lower layer of the gas barrier layer 11. The decorative layer displays decoration, information, and the like formed by printing.

The thickness of the laminate 20 may be selected depending on various types of resistance required for the packaging body formed using the laminate 20, and processability required for the laminate 20. The thickness of the laminate 20 may be, for example, 30 μm or more and 300 μm or less.

The laminate 20 may be formed by, for example, the film-forming methods described above, various coating methods, a dry lamination method, an extrusion lamination method, or the like.

[Packaging Body]

A packaging body will be described with reference to FIG. 3.

Figure 3:
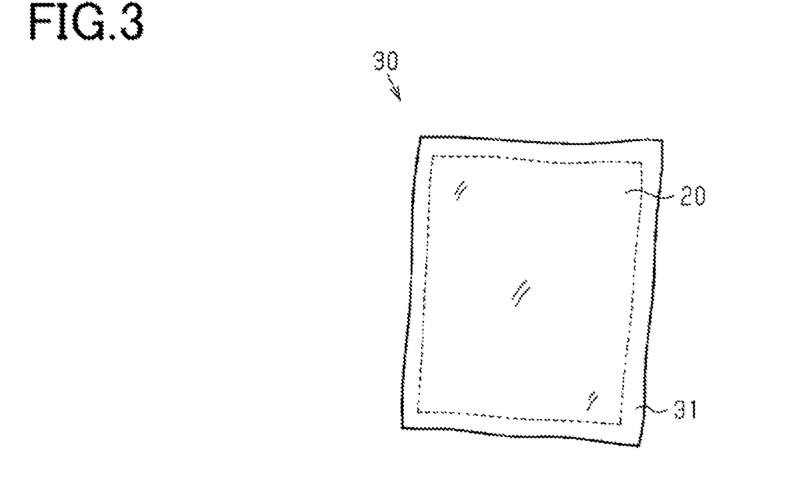
FIG. 3 is a perspective view illustrating a structure of a packaging body according to the same embodiment.

The packaging body 30 shown in FIG. 3 is formed from the laminate 20. The packaging body 30 defines a space that can accommodate a packaging target inside the packaging body 30. In the example shown in FIG. 3, the packaging body 30 has a bag-like shape. The edges of the packaging body 30 are bonded along the entire perimeter to seal the packaging body 30. In the packaging body 30, the gas barrier layer 11 is located inside relative to the resin film 10. The shape and size of the packaging body 30 are not particularly limited. The shape and size of the packaging body 30 may be designed depending on the shape and size of the packaging target. The packaging target may be, for example, food, medicine, cosmetic, or the like.

The method for bonding the edges of the laminate 20 are not particularly limited. For example, the edges of the laminate 20 may be bonded by heat sealing as described above, or may be bonded by other methods. In the example shown in FIG. 3, the packaging body 30 has a sealing portion 31 in two laminates 20 in which the edges of a first laminate and the edges of a second laminate are bonded.

The packaging body 30 is not limited to the bag-like shape shown in FIG. 3, and may have, for example, a tubular bag-like shape in which a first tube end is sealed while a second tube end is open.

[Physical Properties of Resin Film]

The physical properties of the resin film 10 will be described with reference to FIG. 4.

The inventors of the present application found that the flexibility of the resin film 10 contributes to the suppression of reduction in gas barrier performance of the laminate 20, that is, deterioration of the gas barrier performance. Then, the inventors of the present application focused on the dynamic moduli, that is, storage modulus G1, loss modulus G2, and loss tangent (tan δ), as parameters for evaluating the flexibility of the resin film 10.

When an external force caused by vibration or the like is applied to the laminate 20, the gas barrier layer 11 follows the deformation of the resin film 10 to undergo deformation. The storage modulus G1 indicates, of energy generated by stress in an object, a component that is internally stored in the object, and the loss modulus G2 indicates, of the above energy, a component that is externally diffused as heat. That is, the magnitude of the storage modulus G1 indicates the strength of the nature of the resin film 10 as an elastic body, and the magnitude of the loss modulus G2 indicates the strength of the nature of the resin film 10 as a viscous body. The tan δ is the ratio of loss modulus G2 to storage modulus G1 (G2/G1), and indicates the balance between the nature of the resin film 10 as an elastic body and the nature thereof as a viscous body.

As the nature of the resin film 10 as an elastic body is stronger, the shape change is more responsive to the application and release of an external force. That is, when the application and release of an external force to the resin film 10 are repeated in a short period of time, as in the case in which vibration is applied to the resin film 10, the generation of strain by the application of the external force and the strain recovery due to the release of the external force are repeated in the resin film 10 in a short period of time. Therefore, the movement of the gas barrier layer 11 following the resin film 10 becomes large. As a result, defects, such as pinholes, tend to occur in the gas barrier layer 11, so that the gas barrier performance of the laminate 20 tends to decrease.

On the other hand, if the nature of the resin film 10 as a viscous body is strong, the deformation progresses slowly relative to the application of an external force, and the deformation is less likely to be returned to the original state even after the external force is released. Accordingly, even if the application and release of an external force to the resin film 10 are repeated in a short period of time, the movement of the resin film 10 and gas barrier layer 11 can be suppressed. In other words, the absorption of vibration in the laminate 20 is increased. Therefore, the occurrence of defects in the gas barrier layer 11 is prevented, which can suppress reduction in gas barrier performance of the laminate 20.

However, if the nature of the resin film 10 as a viscous body is excessively strong, the suitability of the laminate 20 as a packaging material, such as ease of processing and strength, is reduced. As a result of intensive studies, the inventors of the present application found the ranges of the storage modulus G1, loss modulus G2, and tan δ of the resin film 10 that can suppress reduction in gas barrier performance of the laminate 20 while maintaining the suitability thereof as a packaging material. In the following, the preferred range of each parameter will be described.

In a storage modulus curve indicating the relationship between storage modulus G1 and temperature of the resin film 10, the transition temperature T1 from a glass state to a rubber state is preferably 80° C. or higher and 88° C. or lower, and the storage modulus G1 at the transition temperature T1 is preferably 3.8 GPa or more and 4.1 GPa or less.

The temperature of the environment in which the packaging body 30 is used is often lower than the transition temperature T1; that is, the resin film 10 is used in a glass state with low fluidity. Since the change in the storage modulus G1 is small when the resin film 10 is in a glass state, the nature of the resin film 10 as an elastic body when used as the packaging body 30 can be appropriately evaluated by evaluating the storage modulus G1 at the transition temperature T1.

When the storage modulus G1 at the transition temperature T1 is 4.1 GPa or less, in the resin film 10, the contribution of elasticity in response to the external force does not become excessively large; thus, reduction in gas barrier performance of the laminate 20 is suppressed. On the other hand, when the storage modulus G1 at the transition temperature T1 is 3.8 GPa or more, the nature of the resin film 10 as an elastic body is not excessively weak; thus, decrease in suitability of the laminate 20 as a packaging material can be easily suppressed.

In a loss modulus curve indicating the relationship between loss modulus G2 and temperature of the resin film 10, the temperature T2 at the peak position is preferably 95° C. or higher and 102° C. or lower, and the loss modulus G2 at the peak position is preferably 0.30 GPa or more and 0.37 GPa or less.

The temperature T2 at the peak position in the loss modulus curve is a temperature at which the nature of the resin film 10 as a viscous body is prominently exhibited. As the temperature T2 is higher, the flexibility associated with viscosity tends to be less likely to be exhibited in the low-temperature region, including the temperature of the use environment of the packaging body 30. When the temperature T2 is 102° C. or lower, and the loss modulus G2 at the peak position, that is, the loss modulus G2 at the temperature T2, is 0.30 GPa or more, the flexibility associated with viscosity is likely to be exhibited well in the low-temperature region. Accordingly, reduction in gas barrier performance of the laminate 20 is suppressed.

Moreover, when the loss modulus G2 at the peak position is 0.37 GPa or less, decrease in suitability of the laminate 20 as a packaging material is likely to be suppressed.

In a loss tangent curve indicating the relationship between tan δ and temperature of the resin film 10, the tan δ at the peak position is 0.160 or more and 0.190 or less. The temperature T3 at the peak position is preferably 108° C. or higher and 115° C. or lower.

Since the tan δ is the ratio of loss modulus G2 to storage modulus G1, the influence of factors that depend on the individual sample of the resin film 10 that cause errors in the dynamic modulus can be removed. That is, the variance in the curve shape is small among samples with the same configuration. Accordingly, the tan δ can be used to accurately evaluate the dynamic modulus.

As tan δ is higher, the nature of the resin film 10 as a viscous body relative to the nature thereof as an elastic body is larger; that is, the absorption of vibration is increased. When tan δ at the peak position is 0.160 or more, in the resin film 10, the percentage of the contribution of viscosity relative to the contribution of elasticity in response to the external force becomes sufficiently large; thus, reduction in gas barrier performance of the laminate 20 is suppressed. On the other hand, when tan δ at the peak position is 0.190 or less, the nature of the resin film 10 as a viscous body relative to the nature thereof as an elastic body is not excessively large; thus, decrease in suitability of the laminate 20 as a packaging material is suppressed.

When the temperature T3 at the peak position is 115° C. or lower, the flexibility of the resin film 10 associated with viscosity is likely to be exhibited well in the low-temperature region, including the temperature of the use environment of the packaging body 30.

The temperatures T1, T2, and T3, and the values of storage modulus G1, loss modulus G2, and tan δ at the respective temperatures T1, T2, and T3 can be adjusted according to the production conditions, such as the composition of the resin film 10, the temperature and speed of extrusion and cooling, and the draw ratio. For example, the higher the ratio of isophthalic acid in the total dicarboxylic acid units of PET contained in the resin film 10, the more molecular orientation is inhibited, enhancing flexibility of the resin film 10, which can strengthen the nature of the resin film 10 as a viscous body.

Regarding the cooling temperature, the lower the cooling temperature during the production of the resin film 10, the smaller the storage modulus G1 and the higher the tan δ. As a result, the flexibility of the resin film 10 is increased even in the low-temperature region, which can strengthen the nature of the resin film 10 as a viscous body.

Regarding the cooling speed, rapidly cooling the resin film 10 rather than slowly cooling the resin film 10 allows the resin to crystallize moderately while leaving amorphous portions. Therefore, although the temperature T3 is lowered, tan δ and loss modulus G2 can be increased. As a result, the flexibility of the resin film 10 is increased, which can strengthen the nature of the resin film 10 as a viscous body.

Regarding the draw ratio, the molecular orientation can be suppressed by reducing the draw ratio during the production of the resin film 10; thus, the transition temperature T1 can be lowered, and the increase in the storage modulus G1 can be suppressed. As a result, the flexibility of the resin film 10 is increased, which can consequently strengthen the nature of the resin film 10 as a viscous body.

A known method for evaluating the physical properties of the resin film 10 is a tensile test performed on a sample having a dumbbell shape. According to the tensile test, a stress-strain curve indicating the relationship between the stress applied to the sample and the strain of the sample when the stress is applied can be obtained. The tensile test is defined in JIS K 7161-1:2014.

Figure 4:
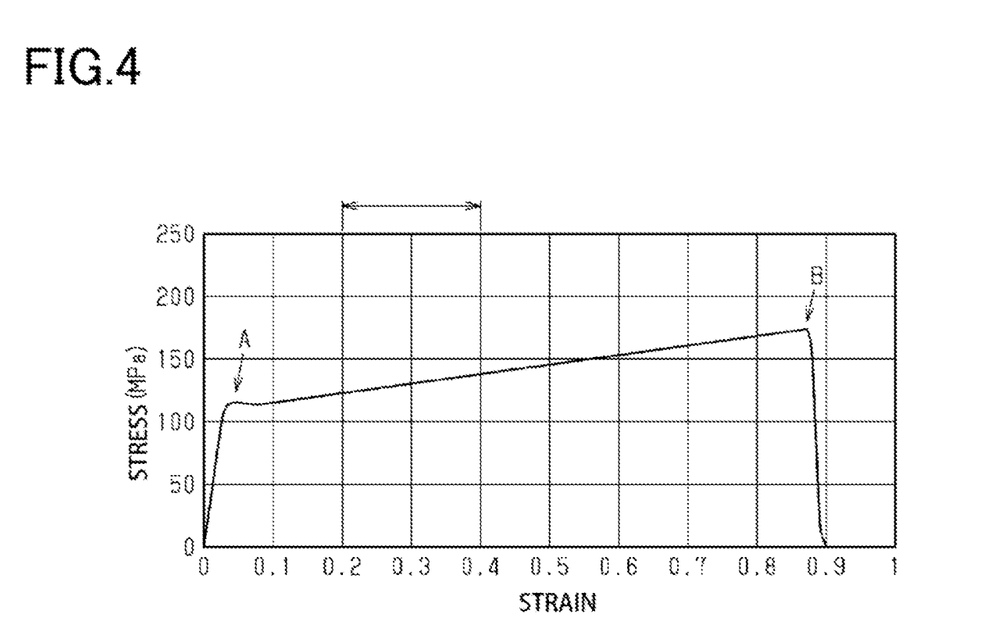
FIG. 4 is a diagram illustrating an example of a stress-strain curve obtained from a resin film.

FIG. 4 shows an example of the stress-strain curve obtained from the tensile test on a sample formed from the resin film 10. In the stress-strain curve shown in FIG. 4, the stress at the yield point A indicated by an arrow is the yield stress. Further, in the stress-strain curve, the breaking point B indicated by an arrow is a point at which the sample is broken, and the stress at this point B is the breaking strength.

In the stress-strain curve, the resin film 10 undergoes elastic deformation in the range including a point at which both the stress and strain are 0 and the other points at which both the stress and strain are smaller than those at the yield point A, with the stress and strain being proportional to each other in the range. In the range of elastic deformation, as the slope of the stress-strain curve is larger, the resin film tends to be harder, and as the slope of the stress-strain curve is smaller, the resin film tends to be softer.

The yield point A is the first part of the stress-strain curve in which the strain increases without increasing the stress. When the stress at the yield point A, that is, pressure exceeding the yield stress, is applied to the resin film, the resin film undergoes plastic deformation. The deformation occurring in the resin film is thereby maintained even after the stress applied to the resin film is released.

In the stress-strain curve, the area surrounded by the curve represents the ability of the resin film to absorb impact energy. As the area surrounded by the stress-strain curve is smaller, the resin film tends to be more brittle, that is, have lower tenacity. In contrast, as the area surrounded by the stress-strain curve is larger, the resin film tends to be less brittle, that is, have higher tenacity.

The resin film 10 satisfies the following condition 1.

(Condition 1) The yield stress of the resin film 10 in the flow direction is 109 MPa or more and 117 MPa or less.

The resin film 10 tends to be harder and more brittle as the yield stress is higher, and tends to be softer and have higher tenacity as the yield stress is lower. When the resin film 10 is used to form the laminate 20 described above, a gas barrier layer 11 made of an inorganic material that tends to be harder than the resin film 10 is bonded to the resin film 10. In order to prevent the occurrence of defects, such as pinholes, in the gas barrier layer 11, it is preferable that the stress acting on the gas barrier layer 11 be transferred from the gas barrier layer 11 to the resin film 10. That is, it is preferable that the resin film 10 is soft and has high tenacity so that the stress acting on the gas barrier layer 11 is consumed inside the resin film 10. On the other hand, if the yield stress of the resin film 10 is excessively small, plastic deformation that causes defects in the gas barrier layer 11 is likely to occur in the resin film 10; thus, it is preferable that the resin film 10 has a predetermined hardness.

In this respect, a resin film 10 that satisfies condition 1 is soft enough not to become excessively brittle, and is hard enough to prevent excessive plastic deformation. Therefore, when the resin film 10 is used in the laminate 20 for forming the packaging body 30, it is possible to prevent the occurrence of defects in the gas barrier layer 11 formed on the resin film 10, and thus suppress reduction in gas barrier performance of the laminate 20 caused by the defects.

When the packaging body 30 using the laminate 20 is mass-produced, a roll-to-roll apparatus is used. While the laminate 20 is carried by the roll-to-roll apparatus, the laminate 20 is subjected to treatment for forming the packaging body 30. The laminate 20 is carried by the roll-to-roll apparatus along the flow direction of the resin film 10. At this time, the laminate 20 is carried by the roll-to-roll apparatus while being stretched along the flow direction of the resin film 10. The resin film 10 is stretched along the flow direction with a stress that does not cause the laminate 20 to loosen or bend, while the laminate 20 can be carried and the packaging body 30 formed using the laminate 20 can be prevented from being wrinkled.

When the packaging body 30 containing contents is carried, the application and release of an external force that bends the packaging body 30 are repeated. The direction in which the external force due to shaking is applied, and the direction in which expansion and contraction are repeated by the application and release of the external force are approximately specified based on the structure of the packaging body 30.

In this respect, as described above, when the yield stress of the resin film 10 in the flow direction is 109 MPa or more and 117 MPa or less, it is possible to achieve a sufficiently large yield stress in order to suppress plastic deformation of the resin film 10 caused by stress applied to the laminate 20 when the laminate 20 is carried. Further, by aligning the direction in which the external force due to shaking is applied with the flow direction of the resin film 10, it is possible to suppress plastic deformation of the resin film 10 and associated reduction in the barrier performance.

The resin film 10 preferably satisfies the following condition 2 in addition to condition 1 described above.

(Condition 2) In the stress-strain curve, the slope of the stress-strain curve after yield at a strain of 0.2 or more and 0.4 or less falls within the range of 75 or more and 117 or less.

When the resin film 10 has a yield point A, the resin film 10 has the yield point at a strain of less than 0.1. When a stress higher than the yield stress at the yield point A is applied, the state in which only the strain increases is released, and the strain increases again according to the increase in stress. At a strain of 0.2 or more, the increase in strain is almost proportional to the increase in stress. As the slope of the stress-strain curve after the yield point A is greater, the resin film 10 is harder, and the difference between the strain at the yield point A and the strain at the breaking point B tends to be smaller. On the other hand, as the slope of the stress-strain curve after the yield point A is smaller, the resin film 10 is softer, and the difference between the strain at the yield point A and the strain at the breaking point B tends to be greater. In the stress-strain curve, the resin film 10 often has the breaking point B at a strain exceeding 0.4, and the tendency in the rigidity of the resin film 10 can be grasped by the slope at a strain of 0.4 or less.

In this respect, in the case of the resin film 10 that satisfies condition 2, when a stress greater than or equal to the stress that causes plastic deformation is applied to the resin film 10, decrease in the strain at the breaking point B is suppressed. This prevents the breakage of the resin film 10 and thus prevents the occurrence of defects in the gas barrier layer 11 formed on the resin film 10.

The resin film 10 preferably satisfies the following condition 3 in addition to condition 1 described above. The resin film 10 more preferably satisfies the following condition 3 in addition to conditions 1 and 2 described above.

(Condition 3) The breaking strength in the flow direction is 153 MPa or more and 183 MPa or less.

The resin film 10 tends to be harder as the breaking strength is higher, and tends to have higher tenacity as the breaking strength is lower. Therefore, if the breaking strength is excessively high, the stress value at which the resin film 10 breaks tends to increase, whereas the strain that the resin film 10 can withstand tends to decrease. In contrast, if the breaking strength is excessively small, the strain that the resin film 10 can withstand increases, whereas the stress value at which the resin film 10 breaks tends to decrease.

In this respect, if the resin film 10 satisfies condition 3, either the stress or strain that the resin film 10 can withstand without breaking can be prevented from becoming excessively low. This allows the resin film 10 to be not easily broken. As a result, it is possible to prevent the occurrence of defects in the vapor deposition layer caused by breakage of the resin film 10.

The yield stress, slope after yield, and breaking strength in the resin film 10 can be adjusted, for example, by the temperature at which the resin film 10 is extruded, the temperature at which the precursor of the extruded resin film 10 is cooled, the speed of cooling the precursor, and the draw ratio of the resin film 10. Further, the yield stress, slope after yield, and breaking strength in the resin film 10 can be adjusted, for example, by the ratio of isophthalic acid in the total dicarboxylic acid units contained in the resin film 10.

For example, the yield stress, slope after yield, and breaking strength can be increased by increasing the temperature of extrusion. Further, the yield stress, slope after yield, and breaking strength can be reduced by reducing the temperature at which the precursor of the extruded resin film 10 is cooled. Further, the yield stress, slope after yield, and breaking strength can be reduced by increasing the speed of cooling the precursor. Further, the yield stress, slope after yield, and breaking strength can be reduced by increasing the draw ratio of the resin film 10. Further, the yield stress, slope after yield, and breaking strength can be reduced by increasing the ratio of isophthalic acid in the total dicarboxylic acid units contained in the resin film 10.

EXAMPLES

Examples and Comparative Examples will be described with reference to FIGS. 5 to 8 and Tables 1 to 5.

Example 1

Three resin layers were laminated by coextrusion to form a resin film 10 of Example 1 having a thickness of 12 μm. At this time, the three resin layers having the same composition were formed from virgin PET and recycled PET recycled by mechanical recycling. In the resin film 10 of Example 1, the mass of the recycled PET was set to 80% relative to the total mass of the resin film, and the mass of the virgin PET was set to 20% relative to the total mass of the resin film.

Example 2

Three resin layers were laminated so that a second resin layer was held between two first resin layers, thereby forming a resin film 10 of Example 2 having a thickness of 12 μm. At this time, the first resin layers were formed from recycled PET recycled by chemical recycling. Further, the second resin layer was formed by mixing recycled PET recycled by mechanical recycling and recycled PET recycled by chemical recycling. In the second resin layer, the mass of the recycled PET recycled by mechanical recycling was set to 80% relative to the total mass of the second resin layer, and the mass of the recycled PET recycled by chemical recycling was set to 20% relative to the total mass of the second resin layer. In the resin film of Example 2, the mass of the recycled PET was set to 100% relative to the total mass of the resin film 10.

Resin film 10 of Example 2 having a thickness of 12 μm

Example 3

Three resin layers were laminated so that a second resin layer was held between two first resin layers, thereby forming a gas barrier 11 including the vapor deposition layer and the coating film. At this time, the first resin layers were formed from virgin PET. Further, the second resin layer was formed from recycled PET recycled by chemical recycling. In the resin film of Example 3, the mass of the recycled PET was set to 70% relative to the total mass of the resin film 10.

Comparative Example 1

A single resin layer was formed using virgin PET to obtain a resin film 10 of Comparative Example 1 having a thickness of 12 In the resin film 10 of Comparative Example 1, the mass of recycled PET was set to 0% relative to the total mass of the resin film.

Example 4

A vapor deposition layer formed from aluminum oxide and having a thickness of 10 nm was laminated on the resin film 10 of Example 1 using a vacuum deposition method. Further, a coating film having a thickness of 0.3 μm was formed by gravure coating on the vapor deposition layer. At this time, a first solution was prepared by adding hydrochloric acid to tetraethoxysilane, and stirring the mixture for 30 minutes to hydrolyze the tetraethoxysilane, and a second solution was prepared by dissolving polyvinyl alcohol in a mixed solution of water and isopropyl alcohol. Then, 60 parts by mass of the first solution and 40 parts by mass of the second solution were mixed to prepare a coating agent. The coating agent was applied to the vapor deposition layer using a bar coater, and then dried with a dryer at 120° C. for 1 minute, thereby forming a coating film. As a result, a laminate of Example 4 comprising the resin film 10 and a gas barrier layer 11 containing the vapor deposition layer and the coating film was obtained.

Comparative Example 2

A laminate of Comparative Example 2 was obtained using the same materials and the same method as in Example 4, except that in Example 4, the resin film 10 of Example 1 was changed to the resin film of Comparative Example 1. As a result, a laminate of Comparative Example 2 comprising the resin film of Comparative Example 1 and a gas barrier layer 11 containing the vapor deposition layer and the coating film was obtained.

[Evaluation Method]
[Measurement of Dynamic Modulus]

Strip-shaped samples were produced from the resin films of the Examples and Comparative Examples. The length of each sample was 20 mm, and the width of each sample was 10 mm. The flow direction (MD direction) in the formation of the resin film was set as the length direction of the sample. Using a dynamic mechanical analyzer (DMA7100, produced by Hitachi High-Tech Science Corporation), the storage modulus $G_1$ and loss modulus $G_2$ of each sample were measured, and tan δ was calculated. The measurement conditions are as follows.

Frequency: 10 Hz
Tensile conditions: strain amplitude: 10 μm
: minimum tension/compression force: 50 mN
: tension/compression gain: 1.2
: force amplitude initial value: 50 mN
Heating conditions: heating rate: 2° C./min
: heating temperature: 30° C. to 180° C.

[Stress-Strain Curve]

Two or three samples were cut from the resin films of Examples 1 to 3 and Comparative Example 1. At this time, using a dumbbell cutter (SDK-600, produced by Dumbbell Co., Ltd.) according to JIS Z 1702?1994, each sample was cut to have a shape extending along the flow direction. That is, the samples were cut from the resin films so that the tensile direction of each sample was aligned with the flow direction of the resin film. Then, each sample was provided with two marked lines for elongation measurement.

Using a compact table-top tester (EZ-LX, produced by Shimadzu Corporation), a tensile test was performed on the samples by a method according to JIS K 7161-1:2014. At this time, each sample was fixed to the compact table-top tester, and the marked lines were held by the extensometer. The test speed was set to 300 mm/min. For each of Examples 1 to 3 and Comparative Example 1, a stress-strain curve was created based on the results of the tensile test on one sample. The yield stress, breaking strength, and slope after yield at a strain of 0.2 or more and 0.4 or less were obtained from each stress-strain curve.

[Gas Barrier Performance]

Two samples were produced from each of the laminate of Example 4 and the laminate of Comparative Example 2, and the gas barrier performance before and after a Gelboflex test was evaluated. The Gelboflex test, oxygen permeability measurement, and moisture permeability measurement were carried out under the conditions described below.

[Gelboflex Test]

The Gelboflex test of each sample was carried out using a flexibility evaluation device (Gelbo Flex Tester, produced by Tester Sangyo Co., Ltd.). At this time, each sample was attached to the fixed head of the flexibility evaluation device so that the sample had a cylindrical shape. Specifically, both ends of each sample were held by the fixed head, and the initial gripping interval was set to 175 mm. Then, while setting the stroke to 87.5 mm and the twist to 440°, reciprocating motion was performed by twisting and untwisting each sample 10 times at a speed of 40 times/min. At this time, the samples used had a rectangular shape of A4 size, that is, 210 mm wide and 297 mm long.

[Oxygen Permeability]

The oxygen permeability of each sample before and after the Gelboflex test was measured using an oxygen permeability tester (OX-TRAN 2/20, produced by Mocon). At this time, a method according to JIS K 7126-2:2006 and ASTM D3985-81 was used. Further, the temperature was set to 30° C., and the relative humidity was set to 70%. The unit of the measured value of oxygen permeability was set as $[cm^3(STP)/m^2 \cdot day \cdot MPa]$.

[Moisture Permeability]

The moisture permeability of each sample before and after the Gelboflex test was measured using a moisture permeability tester (PERMATRAN-W 3/31, produced by Mocon). At this time, the measurement was carried out at a temperature of 40° C. and a relative humidity of 90%. The measurement method used was a method according to JIS K 7129-2:2019 and ASTM F1249-90. The unit of the measured value of moisture permeability was set as $[g(STP)/m^2 \cdot day]$.

[Evaluation Results]

[Dynamic Modulus]

Figure 5:
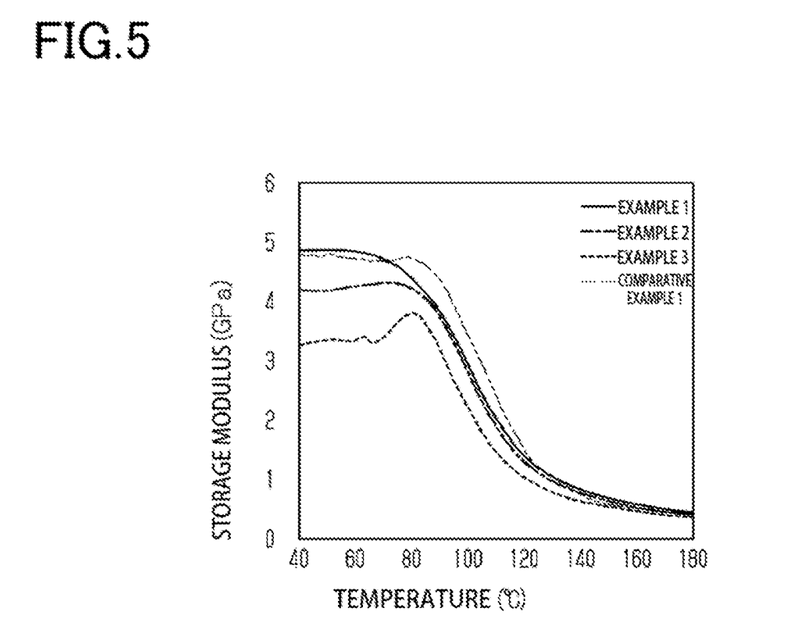
FIG. 5 is a diagram illustrating an example of storage modulus curves in the Examples and Comparative Example.
Figure 6:
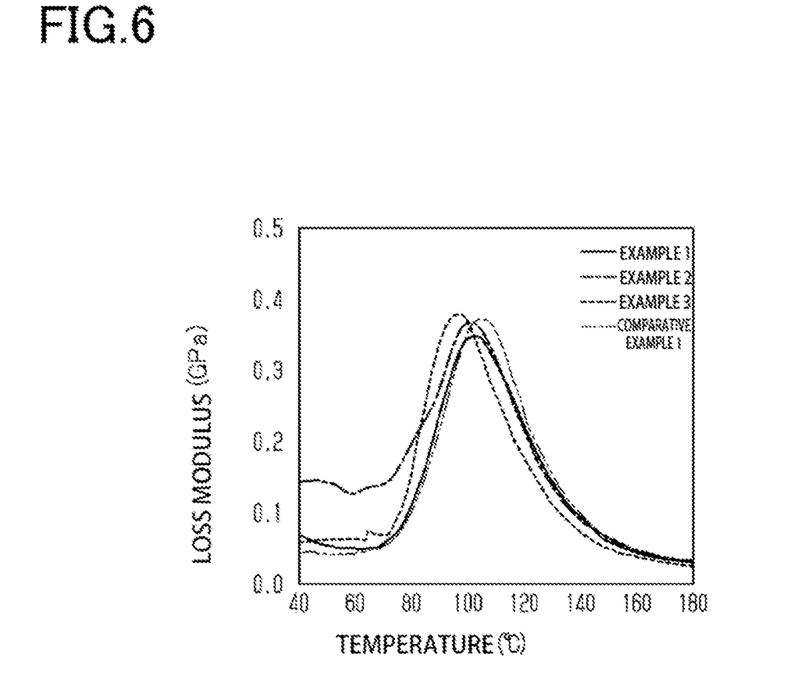
FIG. 6 is a diagram illustrating an example of loss modulus curves in the Examples and Comparative Example.
Figure 7:
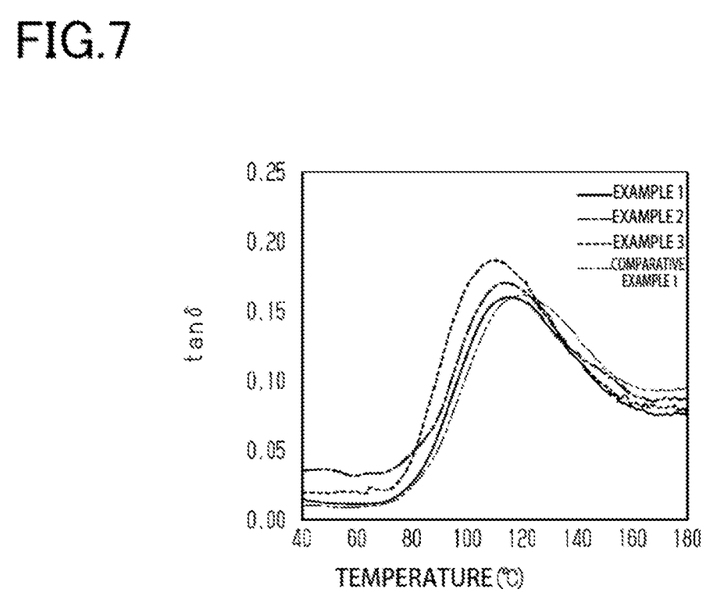
FIG. 7 is a diagram illustrating an example of loss tangent curves in the Examples and Comparative Example.

FIGS. 5 to 7 show curves obtained by measuring the dynamic moduli of the resin films of the Examples and Comparative Example. FIG. 5 shows storage modulus curves, FIG. 6 shows loss modulus curves, and FIG. 7 shows loss tangent curves. The measurement of dynamic moduli was performed on three samples for each Example and Comparative Example. The curves shown in FIGS. 5 to 7 are representative curves among the curves obtained by measurement on the three samples.

Table 1 shows the analysis results of storage modulus, loss modulus, and tan δ of the resin films of the Examples and Comparative Example. Each value in the analysis results is the average of the measured values obtained from the three samples.

Analysis values of the storage modulus are transition temperature T1 in the storage modulus curve and storage modulus G1 at the transition temperature T1. The transition temperature T1 was set as the temperature at the intersection point of an approximate straight line of the glass region on the low-temperature side of the inflection point in the storage modulus curve, and an approximate straight line of the transition region on the high-temperature side of the inflection point. The approximate straight line on the low-temperature side was created by approximating, to a straight line, the inflection point and a group of measurement points from a point about 10 degrees lower than the inflection point to a point about 5 degrees lower than the inflection point. The approximate straight line on the high-temperature side was created by approximating, to a straight line, the inflection point and a group of measurement points from a point about 5 degrees higher than the inflection point to a point about 10 degrees higher than the inflection point.

Analysis values of the loss modulus are temperature T2 and loss modulus G2 at the peak position in the loss modulus curve. Analysis values of the tan δ are temperature T3 and tan δ values at the peak position in the loss tangent curve.

TABLE 1

| | Storage modulus | | Loss modulus | | tan δ | |
|---|---|---|---|---|---|---|
| | Temperature T1 (C.) | Storage modulus G1 (GPa) | Temperature T2 (C.) | Loss modulus G2 (GPa) | Temperature T3 (C.) | tan δ |
| Ex. 1 | 87.6 | 3.8 | 101.3 | 0.34 | 114.8 | 0.162 |
| Ex. 2 | 87.8 | 4.1 | 99.8 | 0.37 | 113.8 | 0.170 |
| Ex. 3 | 80.3 | 3.9 | 95.4 | 0.37 | 108.8 | 0.185 |
| Comp. Ex. 1 | 87.0 | 4.7 | 104.7 | 0.39 | 119.0 | 0.157 |

As shown in Table 1, in Examples 1 to 3, which contain recycled PET, the transition temperature T1 in the storage modulus curve is 80° C. or higher and 88° C. or lower, and the storage modulus G1 at the transition temperature T1 is 3.8 GPa or more and 4.1 GPa or less. On the other hand, the storage modulus G1 of Comparative Example 1, which does not contain recycled PET, is larger than 4.1 GPa. That is, it is suggested that the nature of the resin film of the Comparative Example as an elastic body is stronger than that of the resin films of Examples 1 to 3.

Further, in Examples 1 to 3, the temperature T2 at the peak position in the loss modulus curve is 95° C. or higher and 102° C. or lower, and the loss modulus G2 at the peak position is 0.30 GPa or more and 0.37 GPa or less. On the other hand, the temperature T2 of Comparative Example 1 is higher than 102° C. That is, it is suggested that the resin film of Comparative Example 1 is less likely to exhibit flexibility associated with viscosity in the low-temperature region. The loss modulus G2 at the peak position in Comparative Example 1 is larger than 0.37; however, when compared with the differences in the storage modulus G1 between the Examples and Comparative Example, the differences in the loss modulus G2 are smaller. It is thus hard to say that the nature as a viscous body is noticeably stronger in the Comparative Example.

Moreover, in Examples 1 to 3, the temperature T3 at the peak position in the loss tangent curve is 108° C. or higher and 115° C. or lower, and the tan δ at the peak position is 0.160 or more and 0.190 or less. On the other hand, the tan δ at the peak position of the Comparative Example is less than 0.160. That is, it is suggested that compared with Examples 1 to 3, the nature as a viscous body relative to the nature as an elastic body is smaller in the Comparative Example, and that the percentage of the contribution of viscosity in response to the external force is smaller. Further, the temperature T3 of the Comparative Example is higher than 115° C., which suggests that the resin film of the Comparative Example is less likely to exhibit flexibility in the low-temperature region.

[Stress-Strain Curve]

Figure 8:
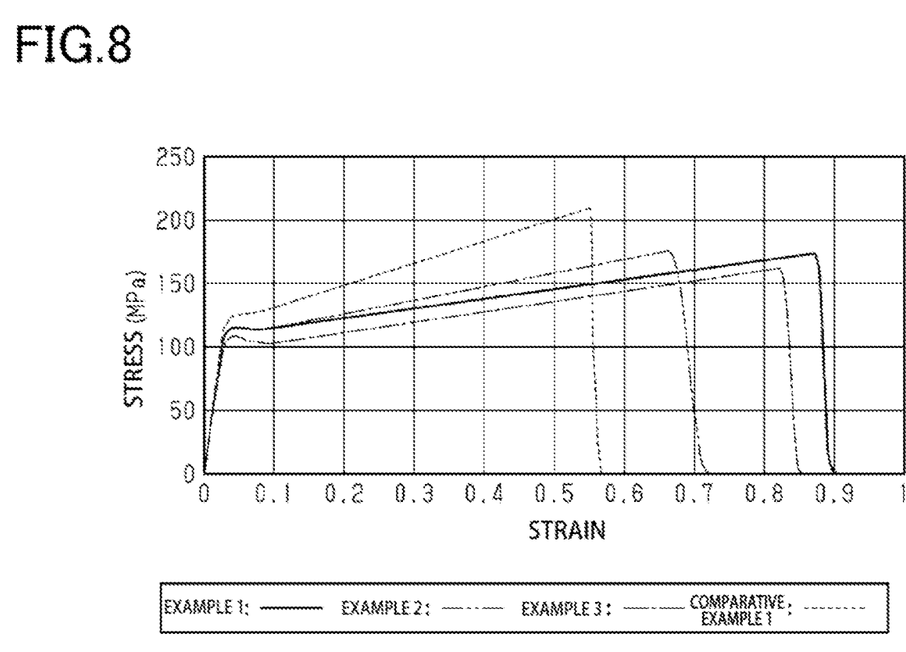
FIG. 8 is a diagram illustrating an example of stress-strain curves in the Examples and Comparative Example.

The evaluation results based on the evaluation methods described above will be described with reference to FIG. 8 and Tables 2 to 4. The stress-strain curves obtained from the resin films of Examples 1 to 3 and Comparative Example 1 were as shown in FIG. 8. FIG. 8 shows an example of the stress-strain curve obtained from each resin film. The yield stress was as shown in the following Table 2, the slope after yield was as shown in the following Table 3, and the breaking strength was as shown in the following Table 4.

TABLE 2

| | Yield stress (MPa) | | | |
|---|---|---|---|---|
| | n1 | n2 | n3 | Average |
| Ex. 1 | 116.8 | 115.7 | 115.5 | 116.0 |
| Ex. 2 | 115.1 | 115.8 | 114.0 | 115.0 |
| Ex. 3 | 110.4 | 109.5 | 110.8 | 110.2 |
| Comp. Ex. 1 | 124.6 | 125.0 | — | 124.8 |

As shown in Table 2, it was found that in the test examples of Examples 1 to 3, the average value of yield stress fell within the range of 100 MPa or more and 116 MPa or less. It was also found that all the values of yield stress fell within the range of 109 MPa or more and 117 MPa or less in each test example. In contrast, it was found that in the test examples of Comparative Example 1, the average value of yield stress was 124.8 MPa, and that the value of yield stress was approximately 125 MPa in each test example. Thus, it was found that the values of yield stress in the test examples of Examples 1 to 3 were lower than the value of yield stress in Comparative Example 1.

TABLE 3

| | Slope after yield | | | |
|---|---|---|---|---|
| | n1 | n2 | n3 | Average |
| Ex. 1 | 75.7 | 77.0 | 79.2 | 77.3 |
| Ex. 2 | 104.5 | 116.2 | 111.0 | 110.5 |
| Ex. 3 | 78.7 | 91.4 | 82.4 | 84.2 |
| Comp. Ex. 1 | 172.1 | 172.6 | — | 172.4 |

As shown in Table 3, it was found that in the test examples of Examples 1 to 3, the average value of slope after yield fell within the range of 77 or more and 111 or less. It was also found that all the values of slope after yield fell within the range of 75 or more and 117 or less in each test example. In contrast, it was found that the average value of slope after yield was 172.4 in the test examples of Comparative Example 1, and that the slope after yield was 172.1 and 172.6 in the two test examples. Thus, it was found that the slope after yield in the test examples of Examples 1 to 3 was smaller than the slope after yield in Comparative Example 1.

TABLE 4

| | Breaking strength (MPa) | | | |
|---|---|---|---|---|
| | n1 | n2 | n3 | Average |
| Ex. 1 | 178.5 | 159.5 | 174.7 | 170.9 |
| Ex. 2 | 176.2 | 170.3 | 182.6 | 176.4 |
| Ex. 3 | 153.9 | 162.3 | 162.7 | 159.6 |
| Comp. Ex. 1 | 195.3 | 210.1 | — | 202.7 |

As shown in Table 4, it was found that the average value of breaking strength fell within the range of 159 MPa or more and 177 MPa or less in the test examples of Examples 1 to 3. It was also found that all the values of breaking strength fell within the range of 153 MPa or more and 183 MPa or less in each test example. In contrast, it was found that the average value of breaking strength was 202.7 MPa in the test examples of Comparative Example 1, and that the breaking strength was 195.3 MPa and 210.1 MPa in the two test examples. Thus, it was found that the breaking strength in the test examples of Examples 1 to 3 was lower than the breaking strength in Comparative Example 1.

[Barrier Performance]

The oxygen permeability and moisture permeability of the laminate of Example 4 and the laminate of Comparative Example 2 were as shown in the following Table 5.

TABLE 5

| | Oxygen permeability (cm$^3$/m$^2$ · day · MPa) | | | | | | | Moisture permeability (g/m$^2$ · day) | | | | | | |
|---|---|---|---|---|---|---|---|---|---|---|---|---|---|---|
| | Before Test | | | After Test | | | | Before Test | | | After Test | | |
| | N = 1 | N = 2 | Avg. | N = 1 | N = 2 | Avg. | | N = 1 | N = 2 | Avg. | N = 1 | N = 2 | Avg. |
| Ex. 4 | 0.7 | 0.6 | 0.7 | 109.9 | 76.2 | 93.1 | | 0.06 | 0.09 | 0.07 | 0.54 | 1.40 | 0.97 |
| Comp. Ex. 2 | 0.6 | — | 0.6 | 167.1 | 138.3 | 152.7 | | 0.19 | — | 0.19 | 2.30 | 1.30 | 1.80 |

As shown in Table 5, it was found that the average value of oxygen permeability after the Gelboflex test was smaller in Example 4 than in Comparative Example 2. It was also found that the variation in oxygen permeability before and after the Gelboflex test was smaller in Example 4 than Comparative Example 2. Further, it was found that the average value of moisture permeability after the Gelboflex test was smaller in Example 4 than in Comparative Example 2. It was also found that the variation in moisture permeability before and after the Gelboflex test was smaller in Example 4 than Comparative Example 2.

Thus, with the laminate of Example 4, the pinhole resistance due to vibration during transportation or the like, which is simulated by the Gelboflex test, increases. This is considered to suppress the increase in the numerical values of oxygen permeability and moisture permeability, that is, reduction in the gas barrier performance.

That is, it was demonstrated that when each parameter of storage modulus, loss modulus, and tan δ fell within the above ranges, the flexibility of the resin film was suitably obtained, which consequently suppressed reduction in gas barrier performance of the laminate caused by the application of external forces. Further, it was demonstrated that when the yield stress in the flow direction fell within the above range, the flexibility of the resin film was suitably obtained, which consequently suppressed reduction in gas barrier performance of the laminate caused by the application of external forces.

As described above, according to the one embodiment of the resin film, the laminate, and the packaging body, the advantageous effects described below can be achieved.

(1) In the loss tangent curve of the resin film 10, the tan δ at the peak position is 0.160 or more and 0.190 or less. This makes the strength of the nature of the resin film 10 as a viscous body relative to the nature thereof as an elastic body preferable, and thus increases flexibility thereof. That is, in the resin film 10, the percentage of the contribution of viscosity to the contribution of elasticity in response to the external force is sufficiently large, resulting in high absorption of vibration. Therefore, even when an external force is repeatedly applied to the laminate 20, the movement of the gas barrier layer 11 laminated on the resin film 10 is suppressed, and the occurrence of defects in the gas barrier layer 11 can be prevented. Accordingly, reduction in gas barrier performance of the laminate 20 can be suppressed. Moreover, since the strength of the nature of the resin film 10 as a viscous body relative to the nature thereof as an elastic body is not excessively high, decrease in suitability of the laminate 20 as a packaging material can be suppressed.

(2) In the loss tangent curve of the resin film 10, the temperature T3 at the peak position is 108° C. or higher and 115° C. or lower. Since this does not make the temperature T3 at the peak position excessively high, the flexibility of the resin film 10 associated with viscosity is likely to be exhibited well in the use environment of the packaging body 30.

(3) In the storage modulus curve of the resin film 10, the transition temperature T1 is 80° C. or higher and 88° C. or lower, and the storage modulus G1 at the transition temperature T1 is 3.8 GPa or more and 4.1 GPa or less. This makes the strength of the nature of the resin film 10 as an elastic body preferable in the use environment of the packaging body 30. That is, in the resin film 10, the contribution of elasticity in response to the external force does not become excessively large; thus, reduction in gas barrier performance of the laminate 20 is suppressed. On the other hand, since the nature of the resin film 10 as an elastic body is not excessively weak, decrease in suitability of the laminate 20 as a packaging material can be easily suppressed.

(4) In the loss modulus curve of the resin film 10, the temperature T2 at the peak position is 95° C. or higher and 102° C. or lower, and the loss modulus G2 at the peak position is 0.30 GPa or more and 0.37 GPa or less. Because of this, the flexibility of the resin film 10 associated with viscosity is likely to be exhibited well in the low-temperature region, including the temperature of the use environment of the packaging body 30. Accordingly, reduction in gas barrier performance of the laminate 20 is suppressed. Further, since the nature of the resin film 10 as a viscous body is not excessively strong, decrease in suitability of the laminate 20 as a packaging material can be easily suppressed.

(5) The resin film 10 can be soft enough not to become excessively brittle, and can be hard enough to prevent excessive plastic deformation. Therefore, when the resin film 10 is used in the laminate 20 for forming the packaging body 30, it is possible to suppress reduction in gas barrier performance of the laminate 20 caused by defects occurring in the vapor deposition layer formed on the resin film 10.

(6) When a stress greater than or equal to the stress that causes plastic deformation is applied to the resin film 10, decrease in the strain at the breaking point B is suppressed. This can prevent breakage of the resin film 10 and thus prevent occurrence of defects in the vapor deposition layer formed on the resin film 10.

(7) Either the stress or strain that the resin film 10 can withstand without breaking can be prevented from becoming excessively low. This can prevent breakage of the resin film 10. As a result, it is possible to prevent the occurrence of defects in the vapor deposition layer caused by breakage of the resin film 10.

(8) The laminate 20 comprising the resin film 10 and the gas barrier layer 11 can suppress reduction in gas barrier performance of the laminate 20 even if a stress that distorts the laminate 20 is applied to the laminate 20. This can increase the suitability of the laminate 20 for use as a packaging material.

(9) The packaging body 30 formed from the laminate 20 can suppress reduction in gas barrier performance of the packaging body 30 caused by, for example, vibration applied to the packaging body 30 during transportation of products. This can suppress deterioration in quality of the object packed by the packaging body 30.

What is claimed is:

1. A resin film configured to form, together with a gas barrier layer, a laminate for producing a packaging body, comprising:
    the resin film containing polyethylene terephthalate, and,
    the resin film being configured to have tan δ of 0.160 or more and 0.190 or less at a peak position of a loss tangent curve indicating a relationship between tan δ and temperature of the resin film.

2. The resin film of claim 1,
    the resin film being configured to have a temperature of 108° C. or higher and 115° C. or lower at the peak position.

3. The resin film of claim 1, wherein:
the polyethylene terephthalate comprises at least polyethylene terephthalate containing terephthalic acid and isophthalic acid in dicarboxylic acid units in its repeating units.

4. A laminate comprising:
the resin film of claim 1; and
a gas barrier layer.

5. The laminate of claim 4, wherein:
the gas barrier layer comprises a vapor deposition layer and a coating film; and
the vapor deposition layer is comprised of at least one of aluminum oxide and silicon oxide.

6. The laminate of claim 5, wherein:
the vapor deposition layer is in contact with the coating film.

7. The laminate of claim 5, wherein:
the coating film comprises a water-soluble polymer having a hydroxyl group, and one or more silicon compounds represented by $Si(OR^1)_4$ or $R^2Si(OR^3)_3$, where $OR^1$ and $OR^3$ represent hydrolyzable groups, and $R^2$ represents an organic functional group, or one or more hydrolyzates of the one or more silicon compounds.

8. A packaging body comprising:
the resin film of claim 1; and
a gas barrier layer.

* * * * *